United States Patent [19]
Aoki

[11] 3,924,994
[45] Dec. 9, 1975

[54] INJECTION DEVICE FOR SYNTHETIC RESIN INJECTION MOLDING

[76] Inventor: Katashi Aoki, 6037 Ozaz Minamijo, Sakaki, Hanishina-gun, Nagano, Japan

[22] Filed: June 17, 1974

[21] Appl. No.: 480,177

Related U.S. Application Data

[63] Continuation-in-part of Ser. No. 226,812, Feb. 16, 1972, abandoned.

[30] Foreign Application Priority Data
Feb. 27, 1971 Japan.................................. 46-9818

[52] U.S. Cl................. 425/242 R; 91/196; 425/166
[51] Int. Cl.² ............................................. B29F 1/00
[58] Field of Search........ 425/242 R, 145, 244, 247, 425/166; 91/196, 176

[56] References Cited
UNITED STATES PATENTS

| | | | |
|---|---|---|---|
| 2,720,755 | 10/1955 | Gardiner............................ | 91/196 X |
| 3,001,233 | 9/1961 | Ernst.................................... | 425/145 |
| 3,240,041 | 3/1966 | Lucke................................ | 91/176 X |
| 3,600,755 | 8/1971 | Cook .................................. | 425/242 |
| 3,806,294 | 4/1974 | Hehl .............................. | 425/145 X |

*Primary Examiner*—Francis S. Husar
*Assistant Examiner*—David S. Safran
*Attorney, Agent, or Firm*—David H. Semmes

[57] ABSTRACT

An injection device for synthetic resin injection molding machine characterized in that:
a. a plurality of hydraulic circuits for a motor for driving the injection device and for hydraulic devices, and other hydraulic elements such as valves are consolidated into a block;
b. the block and the injection device are combined into an integral unit which can be moved along the bed of the injection molding machine; and
c. all hydraulic circuits are driven by an oil pump necessitating only a single flexible pressurized fluid inlet connection.

6 Claims, 8 Drawing Figures

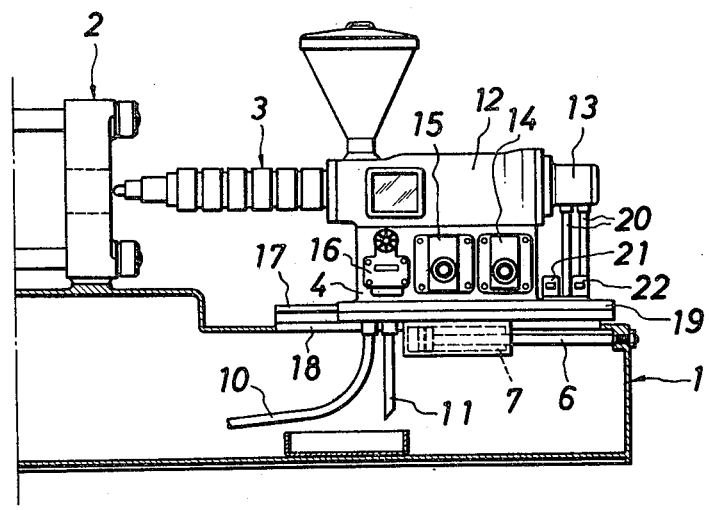
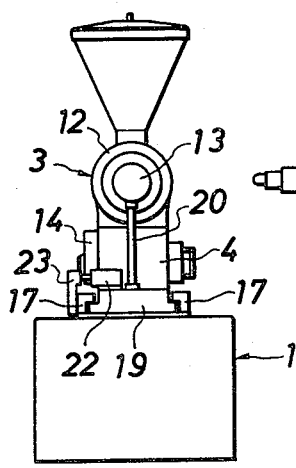
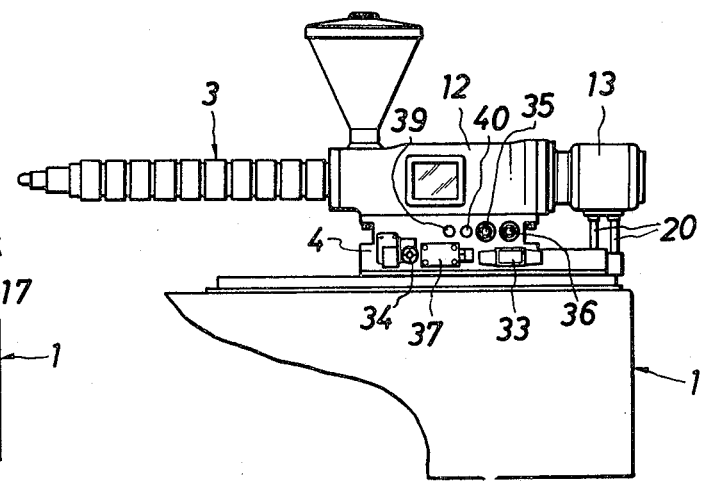

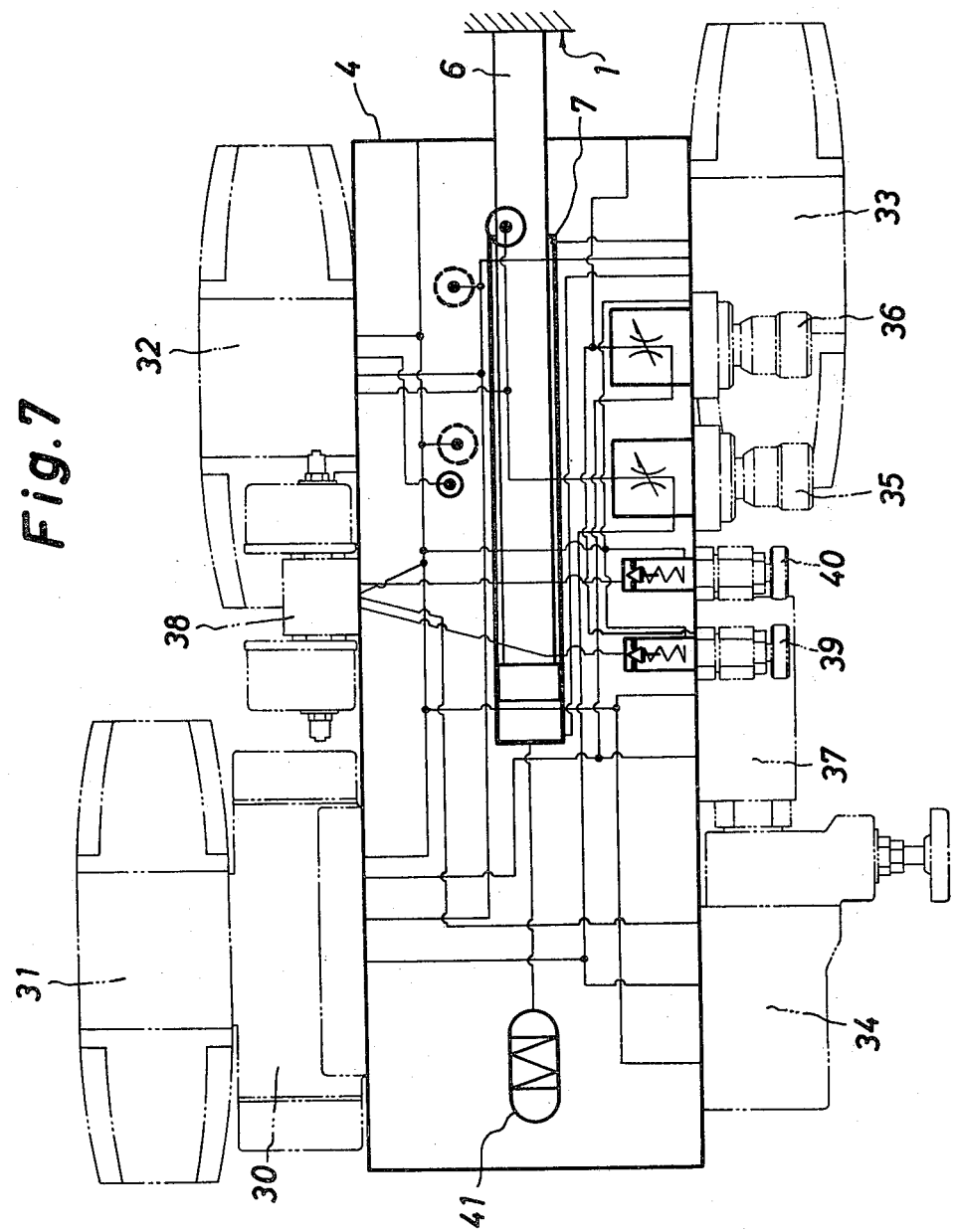

INJECTION DEVICE FOR SYNTHETIC RESIN INJECTION MOLDING

CROSS REFERENCES TO RELATED APPLICATIONS

This application is a continuation-in-part of co-pending application Ser. No. 226,812, filed Feb. 16, 1972, entitled INJECTION DEVICE FOR SYNTHETIC RESIN INJECTION MOLDING, and now abandoned.

BACKGROUND OF THE INVENTION

This invention relates to an injection device for a synthetic resin injection molding machine.

In the heretofore employed injection molding machine, it has been an ordinary practice that a supporting means and a reciprocating means of the injection device are provided on the bed of the injection molding machine, and the injection device is reciprocated in accordance with the operation of the mold clamping device of the injection molding machine.

In such a conventional injection molding machine, the operational pressurized fluid for the injection device (employed for injection cylinder, screw oil-motor, and for nozzle touch) has been supplied from a stationary portion at the bed side to the injection device side through rubber hoses, flexible pipes, or the like. Accordingly, a plurality of these rubber hoses or flexible pipes are disposed between the injection device and the bed, and excessive lengths of these hoses or flexible pipes required for the movement of the injection device must be reserved, for instance, in a looped state in positions outside of the bed, whereby it has been difficult to keep the surrounding portions of the injection molding machine in a good orderly condition.

Furthermore, all of these rubber hoses or flexible pipes must be fitted one by one in various dispositions after the completion of the mounting of the injection device on the bed, such a fitting work requiring much labor and a great care of the installation personnel and lowering the production efficiency of the injection molding machines.

DESCRIPTION OF PRIOR ART

The fabrication of a plastic injection-molding machine having an injection device in a block slideable along a bed is well known. For example, U.S. Pat. No. 3,600,755 (Cook) depicts such a device employing hydraulic mechanisms including circuits and valves. Cook, however, fails to employ hydraulic lines within the block as part of a piston-cylinder unit for reciprocating the mechanism. Thus, Cook could not be modified to provide a plastic injection-molding maching requiring but a single pressurized fluid inlet connection.

Other devices employing blocks hydraulically slideable along a bed are known, such as the forging roll feeding apparatus shown in U.S. Pat. 3,240,041 (Lucke). However, this device employs a great deal of external plumbing while relying upon actuation of internal hydraulic means within the block by externally fed workpieces.

SUMMARY OF THE INVENTION

Therefore, a primary object of the present invention is to provide an improved injection molding machine wherein all of the associated devices required for the reciprocation of the injection device are consolidated into a block, whereby the above described drawbacks of the conventional injection molding machine are substantially eliminated.

Another object of the invention is to provide an improved injection molding machine wherein a plurality of hydraulic circuits and pipe lines are assembled into one block, whereby the fitting works for these members are substantially simplified.

Still another object of the invention is to require an extremely rationalized production process wherein all of the hydraulic circuits and hydraulic elements are assembled into one block which can be independently produced as one unit, whereby the production efficiency of the injection molding machine is substantially elevated.

A further object of the present invention is to provide an improved injection molding machine wherein the required parts of the hydraulic devices are substantially reduced, and not only the economy of the production can be thereby realized, but also the possibility of causing trouble such as oil leakage can be substantially eliminated.

Yet another object of the present invention is to provide an improved injection molding machine requiring but a single pressurized fluid inlet connection.

The nature, principle, and the utility of the present invention will be better understood from the following detailed description of the invention when read in conjunction with the accompanying drawings wherein like parts are designated by like reference numerals.

BRIEF DESCRIPTION OF THE DRAWINGS

In the drawings:

FIG. 4 is a profile view, partly in section, of the second embodiment of the present invention;

FIG. 5 is a rear side view of the same embodiment as shown in FIG. 4;

FIG. 6 is a profile view, partly in section, of the third embodiment of the invention;

FIG. 7 is a schematic diagram showing hydraulic circuits and hydraulic devices included in a block formed in accordance with the present invention.

DETAILED DESCRIPTION OF THE INVENTION

Figure 1:
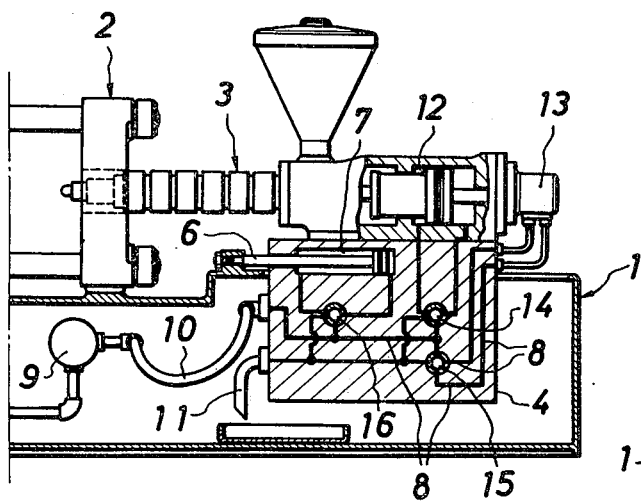
FIG. 1 is a schematic profile view, partly in section, of one part of the injection molding machine at a nozzle-touching position wherein hydraulic circuits are indicated schematically.
Figure 3:
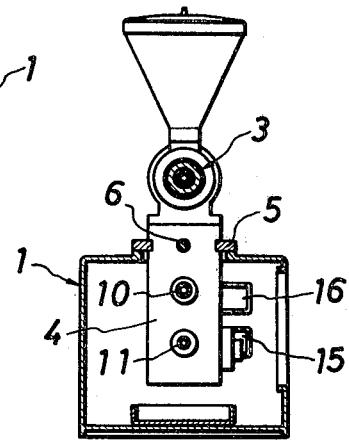
FIG. 3 is a cross-sectional view of the injection molding machine along the line III—III in FIG. 2.
Figure 2:
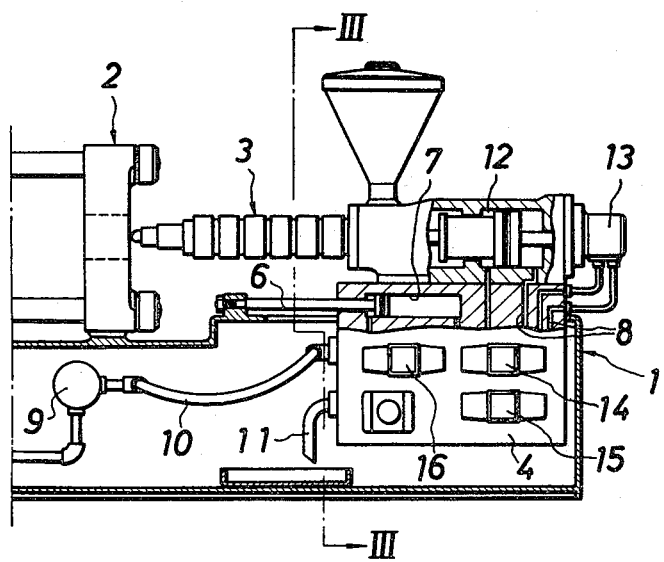
FIG. 2 is a profile view, partly in section, of the injection molding machine at a retracted position wherein a part of valves are indicated.

Referring to FIGS. 1 through 6, there is indicated a bed 1 on which are mounted a mold-clamping device 2 and an injection device 3. On one longitudinal side of the bed 1, that is, in a portion where the injection device 3 is located, a block 4 hydraulically reciprocable on the bed 1 is mounted slidably along guiding metal members 5, 5 provided at both sides of the bed 1, and the injection device 3 is directly coupled to the upper surface of the block 4.

In the block 4, a cylinder 7 including a piston 6 having one end fixed to the bed 1 for driving the block 4 and a plurality of branched passages 8, 8 for passing hydraulic fluid are provided. The branched passage 8, 8 are fabricated in such a manner that, in the case where the block 4 is made of a plurality of members connected together, a plurality of grooves are formed in these members with required holes connected thereto, and when the block 4 is made of single block a plurality of holes are bored from the outside in required directions with the unnecessary portions of the holes being closed by the insertion of blinding plugs. The branched passages 8, 8 are connected with a pressurized fluid applying pipe 10 the only inlet connection necessary being led from an oil pump 9 provided outside of block 4 and also with a return pipe 11. A plurality of valves 14, 15, and 16 are provided for respective pairs of branched passages connected to the cylinder 7, an injection cylinder 12, an oil motor 13, and the like, and the pressurized fluid supplied thereto is controlled.

With the above described constructions, the injection device 3 is advanced or retracted together with the block 4 under the action of the pressurized fluid supplied through the pipe 10, and the ram inside of the injection cylinder 12 is also advanced by the pressurized fluid. Furthermore, the oil-motor 13 is coupled through the ram to a screw in a heating cylinder is also controlled by the valve 15 and shifts a material in the heating cylinder.

In FIGS. 4 and 5, there is indicated another example wherein the pressurized fluid supplying pipe 10, return pipe 11, and the block driving piston 6 and cylinder 7 are provided underside of the block 4. In this example, guiding members 17, 17 are also provided along the longitudinal portion of the bed 1 wherein the injection device 3 is located in such a manner that the members 17, 17 are disposed in parallel on both sides of a channel 18 provided along the bed 1. Between the guiding members 17, 17, a bottom plate 19 of the block 4 is received, whereby the block 4 can be reciprocated freely along the length of the bed 1.

In this example, there are also provided in the block 4 a cylinder 7 including a piston 6 one end of which is fixed to the bed 1 for driving the block 4, and a required number of branched passages (not shown for the simplification of the drawing) for passing the pressurized fluid. The branched passages are connected to the outwardly provided supply pipe 10 and a return pipe 11, and the pressurized fluid to be supplied to the oil-motor 13 attached to the injection cylinder 12 located at the upper part of the block 4 is passed through pipes 20, 20 provided on the rear portion of the bottom plate 19 in an uprising manner. Supply pipe 10 again being the only pressurized fluid inlet connection necessary.

On the bottom plate 19, there is also provided limit-switches 21, 22, while a limit-switch actuating piece 23 is provided on one side of the guiding members 17, 17, so that when the block 4 is moved to the extremities of its passage, either one of the limit-switches 21 or 22 will be operated.

In FIG. 6, there is indicated still another embodiment of the present invention, wherein the block 4 is mounted freely slidably on the bed 1 as in the cases of the two embodiments which have been described hereinbefore. In this embodiment, a relief valve 34 for adjusting the injection pressure, a relief valve 37 for adjusting the screw speed, a valve 40 for adjusting the screw backpressure, a check valve 35 for adjusting injection speed, a valve 36 for adjusting the screw rotation, a valve 33 for changing-over the nozzle-touch, and others are provided on one side of the block 4, and on the other side of the block 4, there are provided change-over valves 20, 21 for transferring the rotation of the injection screw, a valve 38 for transferring between the screw back-pressure and the injection secondary pressure, a valve 32 for transferring the release of the injection retracting pressure, and others (also refer to FIG. 7).

Furtthermore, in the central portion of the block 4, a cylinder 7 for the nozzle-touch is provided, and on one side of the cylinder 7, there is provided an accumulator 41.

Figure 8:
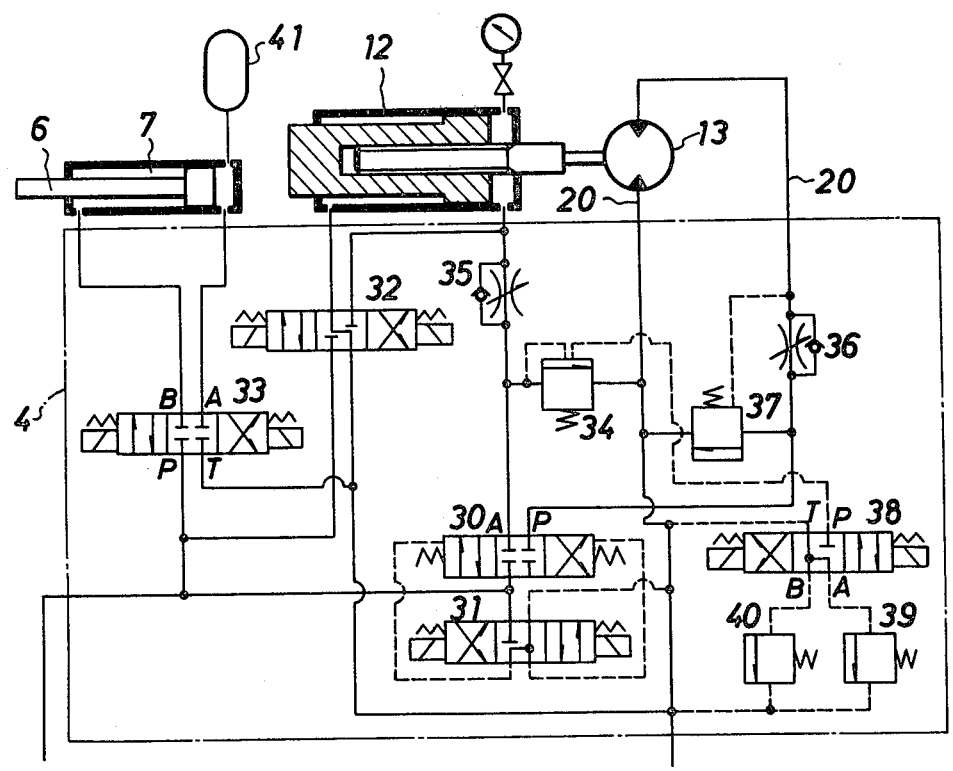
FIG. 8 is a circuit diagram of the hydraulic circuits consolidated into the block.

The hydraulic circuits for supplying pressurized fluid through the above-mentioned valve to the respective hydraulic elements are formed in various positions in the block as shown in the drawing, and a hydraulic system as shown in FIG. 8 is thereby provided.

According to the present invention, since various hydraulic circuits and hydraulic elements associated with the injection device are combined into a block coupled to the injection device, the assembling work of the hydraulic circuits and elements can be accomplished by merely assembling the block with the remaining devices of the injection molding machine. Accordingly, the conventional practice of connecting each individual elements with the respective pipes is substantially simplified, and the possibility of leaking oil is also minimized.

Furthermore, on site set up is simplified in that the entire device of the present invention can be made operational by a single pressurized fluid inlet connection and drain.

I claim:

1. In an injection molding machine for a synthetic resin including a mold clamping device, an oil pump all mounted upon a stationary bed, and an injection cylinder with a ram and a screw in a heating cylinder all horizontally disposed said injection device being reciprocably mounted upon said stationary bed, the improvement comprising:
   A. a block slidably mounted on said bed and movable reciprocably in a horizontal plane toward and away from said mold clamping device said block further including a horizontal and planar upper surface;
   B. said injection device further including a horizontal and planar lower surface removably coupled to said planar upper surface of said block and thereby integrally horizontally movable therewith, said injection device further including an oil motor coupled through said ram to said screw in said heating cylinder;
   C. a cylinder and piston for reciprocating said injection device to obtain a nozzle-touch of said injection device wherein;
   D. said block includes a cavity therein defining said cylinder, said piston being mounted and operatively contained in said cylinder, a piston rod connected to said piston extending out of said block and being fixedly attached to said bed and fixedly positioning said piston with respect to said bed, said block containing said cylinder being horizontally movable with respect to said fixed piston mounted therewithin;
   E. said reciprocal block further comprising therein a plurality of hydraulic circuits, including circuits for controlling said ram in said injection cylinder and said oil motor of said injection device, and a nozzle-touch control circuit opening into spaced positions in said cylinder on opposite sides of said piston operable for controlling said horizontal reciprocating movement of said block with respect to said piston and;

F. a plurality of control valve means respectively in said plurality of hydraulic circuits;

G. wherein all of said hydraulic control circuits and said valve means are incorporated and consolidated into said block with said ram communicating therewith by passages including ports through said horizontal upper surface of said block; and H. said hydraulic circuits fluid pressure supply is by a single main pressurized fluid inlet on said block which is connected to said oil pump through a flexible pipe.

2. An injection molding machine as set forth in claim 1 wherein said cylinder for realizing the nozzle-touch of the injection device and an accumulator are horizontally aligned within a middle portion of said block and within said plurality of hydraulic circuits.

3. An injection molding machine as set forth in claim 2 wherein a plurality of control handles for said valves are provided mounted upon external surfaces of said block and two pipes being arranged between said ports on said block and said oil-motor.

4. An injection molding machine as set forth in claim 3 wherein a rearwardly projecting bottom plate is further provided on said block including hydraulic circuits, said cylinder, and valves, and said bottom plate is received between a pair of guiding members provided on the bed.

5. An injection molding machine as set forth in claim 4 wherein a a port on a surface of said bottom plate provided on said block is connected to said oil motor hydraulic circuit and communicates to said oil-motor through said two pipes rising upward from the bottom plate.

6. An injection molding machine as set forth in claim 5 wherein limit switches for further controlling valve means within said nozzle-touch circuit are provided on the rearwardly projecting portion of the bottom plate so that the movement of the injection device is thereby limited.

* * * * *